Oct. 11, 1938.  T. A. DAVIS  2,132,780
RACKET FRAME
Filed Aug. 5, 1933  2 Sheets-Sheet 1
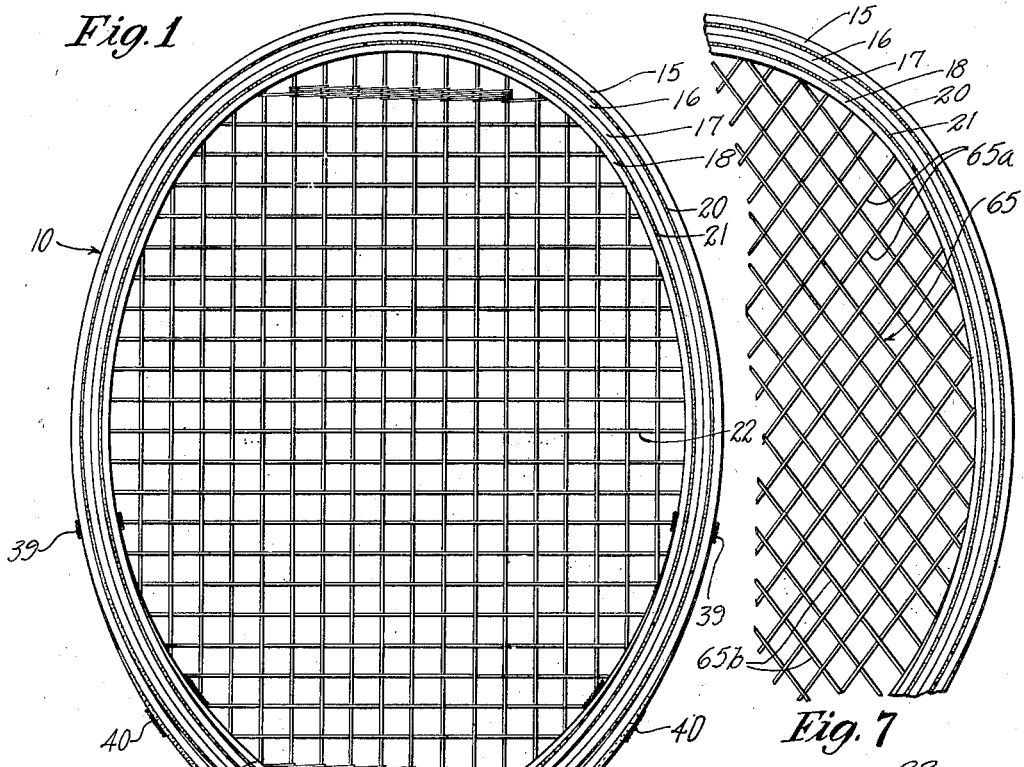
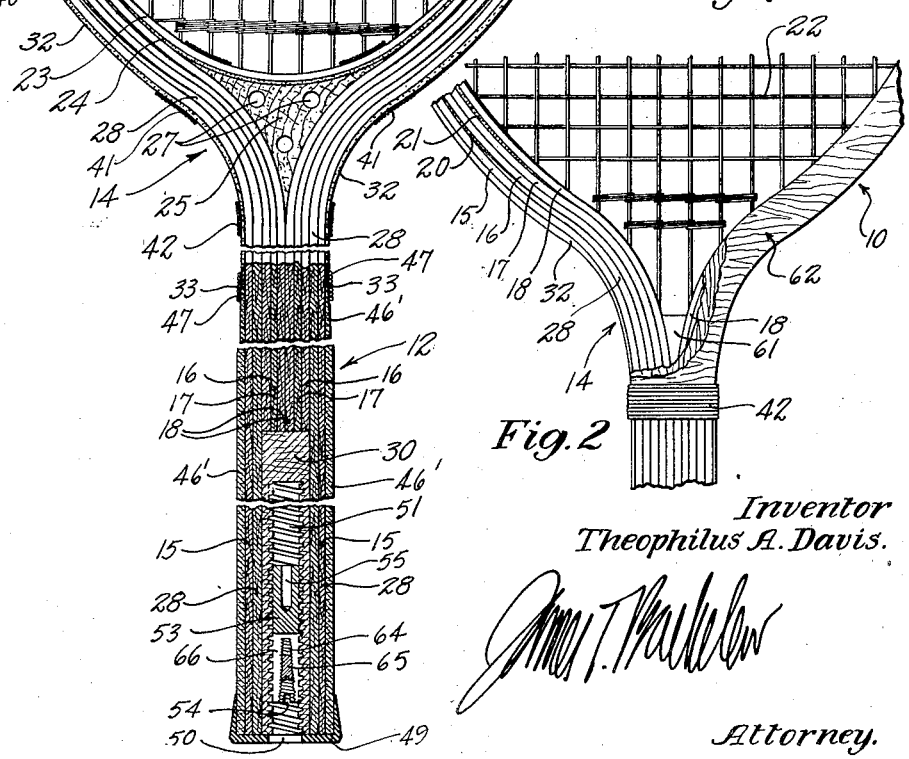
Inventor
Theophilus A. Davis.
Attorney.

Oct. 11, 1938. T. A. DAVIS 2,132,780
RACKET FRAME
Filed Aug. 5, 1933 2 Sheets-Sheet 2
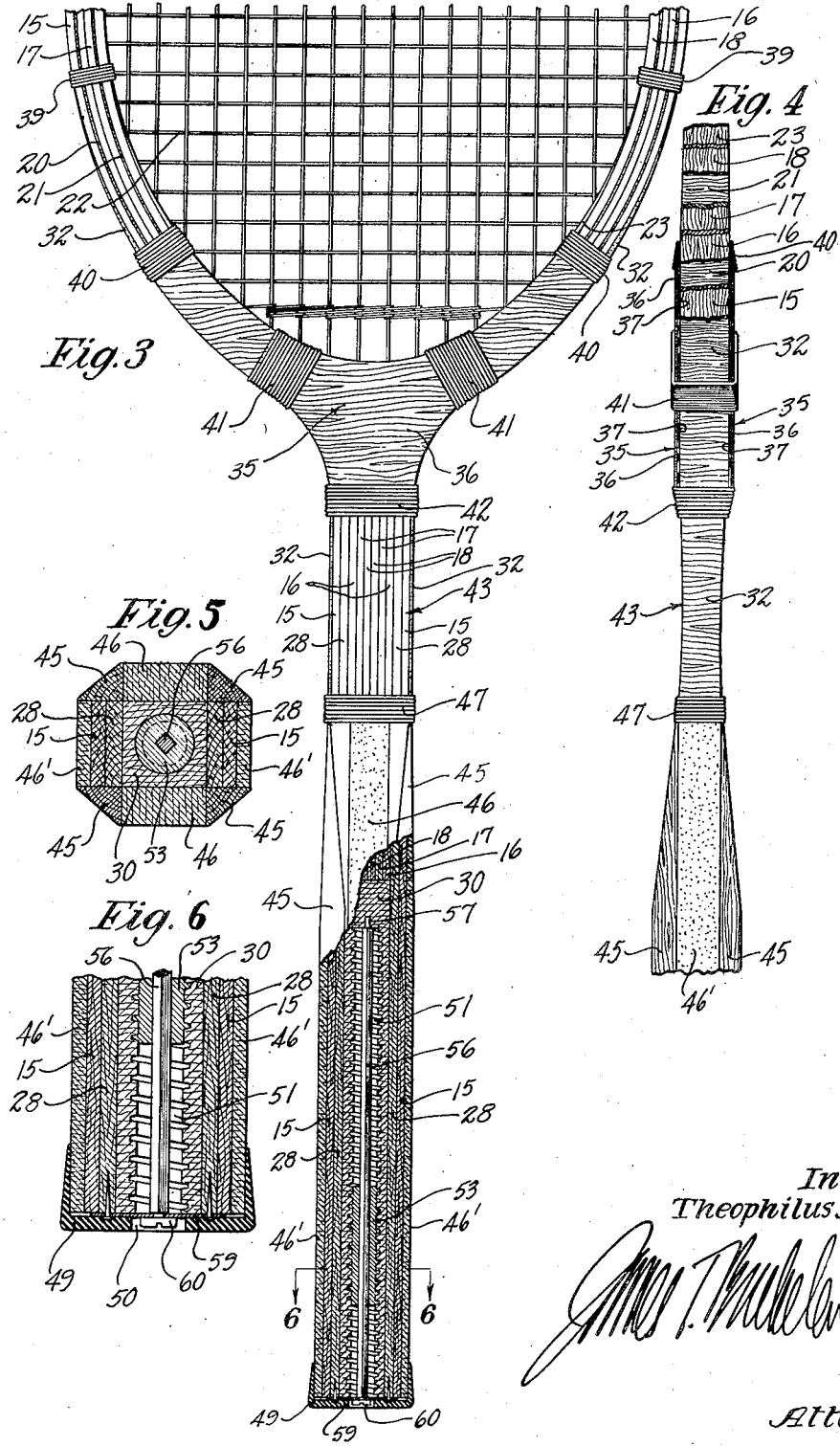
Inventor
Theophilus A. Davis
Attorney.

Patented Oct. 11, 1938

2,132,780

UNITED STATES PATENT OFFICE 2,132,780

RACKET FRAME

Theophilus A. Davis, Los Angeles, Calif.

Application August 5, 1933, Serial No. 683,781

2 Claims. (Cl. 273—73)

This invention has reference to tennis rackets and the like, the principal objects of the invention being directed to improvements in racket frames whereby the strength and resilient characteristics of the latter are increased, and the appearance and balance of the racket generally improved.

In accordance with the invention, I have provided an improved frame construction in which substantially the entire frame is made up of ply wood giving the frame particularly great strength and resiliency and a shape permitting proper balancing of the racket. The oval head and handle of the frame may be described as being formed by a plurality of wooden plies converging toward a throat and then continuing substantially the length of the handle. Great strength is given the frame, without necessity for heavy construction, by alternating adjacent plies with reference to the direction of the grain in the wood. That is to say, the plies will be so matched that the grain in one ply will run in a given direction, and the grain in an adjacent ply in a different angular direction, and so on throughout the several plies. I may also provide a ply wood bridge extending across the throat, although the provision of a bridge is a matter of choice.

The result of so crossing the grain of several successive plies of wood is to produce a head frame having unusually great resistance to cracking or splitting. Most racket failures begin with minute cracks in the head; and the continual heavy impact from driving enlarges the cracks until the frame at the head, now greatly weakened, suddenly shears off. So very few sound rackets are broken by a single stroke or two, that it is not a problem of enlarging the cross-section to gain added strength, but of so building up the frame that small checks and cracks do not start. By my invention I so place the plies of wood that they mutually reenforce each other, so that cracks will not start unless the blow is sufficient to completely shear the wood.

The above features and objects of the invention, as well as additional contemplated objects, will be explained to best advantage from the detailed description to follow wherein I have set forth my invention as embodied in a tennis racket, though it will be understood that rackets for squash and other games may be made according to my invention. Reference is made throughout the description to the accompanying drawings, in which:

Fig. 1 is a longitudinally contracted view, partly in section and with the veneer throat cover removed, of a preferred form of tennis racket embodying the invention;

Fig. 2 is a fragmentary view showing a variational form of throat construction;

Fig. 3, partly in section, shows the veneer throat cover in place and illustrates a variational form of adjustable balancing means in the handle;

Fig. 4 is a fragmentary side view of the racket at its throat, the several plies of the head being broken away singly at spaced points to illustrate the relative directions of the grain therein;

Fig. 5 is an enlarged section of the handle on line 6—6 of Fig. 3;

Fig. 6 is a fragmentary enlarged section of the lower end of the handle illustrated in Fig. 3; and Fig. 7 is a fragmentary elevation of a head showing a variational manner of stringing.

Referring first to Fig. 1, the racket is seen to comprise an oval shaped head and a handle, generally indicated at 10 and 12, respectively, the head being formed of a plurality of wooden plies in oval formation converging at the lower end toward throat 14 and thence, except for certain plies which are cut out to permit insertion of the adjustment screw block (to be described) in the handle, continuing onwardly to form the handle. The several plies are formed to the desired shape of the frame by placing them in a press, the contacting surfaces of the plies having been previously coated with an adhesive, and the frame is then allowed to remain in the press a length of time sufficient for the adhesive to dry and the plies to become securely glued together to form a rigid frame.

Examination of Fig. 1 shows that the head portion of the frame includes four relatively thicker plies 15, 16, 17 and 18 which pass all the way around the head and extend beyond the throat down into the handle. Each of these plies is preferably of a uniform thickness throughout its length. There are also two relatively thinner plies 20 and 21 which taper to ends at a point at each side of the head near where the throat begins, thus making a total of six plies forming the major portion of the head.

In this form of the invention there is also provided a bridge member extending across throat 14 on the inside of the head. This bridge comprises a thick ply 23 and a thin ply 24 glued together and to the frame on the inner surface of the head. The ends of the plies begin to taper after the bridge crosses the opening in the throat, in order to form a smooth joint with the head.

The number of plies used in the bridge may be other than two as illustrated, but this number is preferred since adequate strength is thereby obtained without any sacrifice in flexibility. The thicker ply 23 is preferably placed on the outside and is of relatively hard wood so as to resist deformation or splitting by the strings 22 after they are placed in tension.

I preferably, though not necessarily, insert within the triangular frame space at the throat, a block 25 shaped in accordance with the curvatures of the frame sides and the bridge at this point. Block 25 may conveniently be of wood, and may have holes 27 drilled therein to reduce its weight. The purpose of the inserted block is primarily to give added strength to the frame at its throat, and the block is made substantially integral with the frame and bridge by gluing it into the throat opening.

In order to give the frame added strength at the throat and to build up the handle, there is added to the four major plies 15, 16, 17 and 18, a fifth thick ply 28 beginning with a taper at the tapered ending of thin ply 20, i. e. at a point near the upper end of the throat. Since there is one such ply 28 continuing on from each end of ply 20, there are in reality two plies 28 which extend downwardly into the handle, as shown in Fig. 1. Placed one on each side of the frame, is a pair of external plies 32. The upper ends of these last plies are tapered and begin at points substantially opposite the upper ends of the bridge, the plies then extending downwardly over the outside of the frame and terminating at points 33 at the upper end of the handle.

As previously mentioned, great strength is given the frame without any reduction in resiliency by building the frame up from a plurality of layers or plies of wood so selected and arranged that the grains of the several plies run at angles to one another. This construction is important in that it now provides the strength, heretofore found in a heavier frame, in a relatively lighter frame having somewhat greater resiliency. The preferred arrangement of the plies is shown best in Fig. 4, where the several layers are broken away one at a time to show in elevation the layer next beneath and the direction of the grain therein. In this arrangement the grain in certain of the plies runs substantially longitudinally of the plies and of the head, and the grain in the other plies runs substantially at right angles thereto or transversely of the plies and of the head. Thus, the grain in the four major or thick plies 15, 16, 17 and 18 of the head is arranged to run longitudinally while the grain in the two thin plies 20 and 21 runs crosswise or transversely. In this manner the strength of the main longitudinally grained plies across the grain is utilized to resist the bending caused when a blow is struck; and the strength across-grain of the transversely grained plies 20 and 21 is utilized to prevent checking or cracking of the major plies and so to reenforce them. Also, the utilization of several plies, even though all longitudinally grained, causes the plies to reenforce one another at any point of weakness and so localizes any tendency to crack. While a greater or lesser number of transversely grained plies, like 20 and 21, may be used it has been found sufficient to provide one cross-grained ply between each pair of longitudinally grained plies, and that such cross-grained plies may be relatively thinner than the major ones.

Since the throat has, as described, been reenforced by other means against bending, exterior ply 32 may conveniently be made cross-grained and thus act as an additional reenforcement to ply 15. Another reason for so directing the grain in plies 32 is that strings 22 in passing over the outside of the frame are perpendicular to the grain and so do not cut in. This same advantage is had at the top of the racket, since outside ply 15 is recessed to receive the strings which are then very close to ply 20 that has its grain running perpendicular to the strings and so resists the cutting in of the tensed strings.

The bridge extending across the throat is composed of plies 23 and 24, and from Fig. 4 it will be seen that ply 23 is longitudinally grained. Ply 24 is not shown in that figure (see Fig. 1) but it is preferably thin and cross-grained so as to reenforce plies 23 and 18 lying on either side of it.

Tests have demonstrated the superiority of the ply arrangement shown in Fig. 4 from the standpoint of giving the frame maximum strength and greatest resistance to rupture of the plies as a result of flexure and tensional stresses in the frame. Inspection of the plies of fractured frames has revealed the fact that in a great many instances the failure occurs in transversely grained plies in which the grain also extends diagonally of the peripheral side of the frame, as distinguished from plies 20 and 21 in Fig. 4 which extend substantially normal to the plane of the head and at substantially right angles with the longitudinally grained plies 15, 16, 17, 18 and 23. Where the grain of the transversely grained plies extends diagonally, and tension on the strings causes longitudinal tensional stresses to be set up in the frame, this tension is transmitted to the transversely grained plies as shearing stresses between the grains of the wood. And as stated above, this stress is frequently so great as to cause the plies to fail.

But where, as in Fig. 4, the grain of plies 20 and 21 is both normal to the plane of the head and at right angles with the grain of the longitudinal plies, no shearing stresses are set up within the grain of the wood, and practically the entire stress on these plies is taken up in tension. The result is that the frame is very greatly strengthened, since the transversely grained plies are materially stronger in resistance to tension tending to pull the grain apart than stresses acting to shear along the grain.

The weight of the frame and the balance of the head may be very nicely controlled by varying the width of the head, as viewed in Fig. 4. In this figure it will be noticed that the width of the plies in the head tapers slightly toward the top to remove excess head weight. By regulation of the amount of wood cut away as determined by the depth of cut, and the location of the wood removed as determined by the angle of taper, the balance of the frame may be held within very close limits.

To strengthen the frame at the throat and at the same time to enhance the appearance of the racket, thin cover plates 35 of wood veneer are glued to opposite faces of the frame at the throat, as shown in Figs. 3 and 4. These veneer plates extend for a short distance toward the handle and up along each side of the head as shown. Each of these veneer covers 35 is preferably made up of two plies, though more or fewer may be used, having their grains running across each other in a manner that will be clear from the foregoing description. The grain of the outside ply 36 is shown as running across the longitudinal axis of the frame while the grain of the under ply 37 (not shown) extends parallel to the axis. Veneer covers 35 resist any forces tending to spread the plies or the throat, and make such a sturdy construction that the conventional dowel pin may be omitted if desired. After gluing on the veneer covers, the head of the racket is finished by adding suitable wrappings. Thus wrappings 39 are placed at the upper termination of the bridge and outside ply 32, wrappings 40 at the upper termination of the veneer 35, wrappings 41 conveniently situated at the throat, and wrappings 42 at the lower termination of veneer 35. The several wrappings aid in binding together the various plies making up the frame.

Immediately below the throat 14, the thickness of the handle at 43 is slightly reduced, see Fig. 4, to increase the resiliency of the frame at this point.

Taking up now the construction of the handle, reference is again had to Fig. 1 wherein it will be seen that plies 15 and 28 continue without interruption to the lower end of the handle, while plies 16, 17 and 18 stop at a point about midway of the handle to permit the insertion of screw block 30 between plies 28. This construction is shown in Fig. 5.

Handle 12 is then brought to proper size by securing to the frame members, already described, wooden strips 45, 46 and 46'. Insert strips 46 and 46' are preferably made of some light wood, such as balsa wood, cut at right angles to the grain so that the end of the grain is exposed on the exterior surfaces of these insert strips. In this manner the maximum resistance of the wood to crushing is provided. The beveled corner inserts 45 are made of a relatively harder wood, such as bass wood, so as to prevent the deformation or disfiguring of the handle as a result of accidental blows. Side inserts 46' are tapered at their upper ends to the thickness of the plies 32 and form a continuation thereof from the termination of these plies at 33, the joint between the plies and side inserts being covered by wrapping 47.

The end of the handle is finished by placing a rubber cap 49 over the end and securing it to the wood. The sides of the cap are tapered upwardly to provide a smooth grip and the end of the cap is provided with a hole at 50 for the purpose now to be described.

Screw block 30 is a wooden block with a longitudinaly extending bore 51 drilled therein at right angles to the grain of the wood since the threads cut in the wall of the bore have greater strength and are less likely to strip. The grain in block 30 preferably has its ends adjacent plies 28 so that the block will resist crushing when the handle is placed in a stringing press. A metallic screw or weight 53 is threaded into bore 51 so that by rotation of the weight it may be adjusted longitudinally of the bore. Screw 53 preferably fits the bore snugly so that it will be held in adjusted position by frictional engagement with the bore walls. The lower end of weight 53 is provided with a slot 54, to which access is had through hole 50 in cap 49, so that the weight may be rotated by inserting a screw driver in the slot. In order that the weight be of sufficient length to prevent jamming within the bore and that it may develop a sufficiently strong frictional grip with the thread, and yet not be of excessive weight, the weight is drilled out at 55 from its upper end in order to lighten it the desired amount.

As a means of positively locking the weight in position, it is provided with threaded taper bore 64 within which is screw 65. As indicated at 66, the weight 53 is slotted so as to expand when screw 65 is advanced into bore 64, to thus lock weight 53 in place. It is released by withdrawing screw 65. Other locking means may be used if desired.

By moving the threaded weight lengthwise of bore 51, the center of gravity of the racket is changed to adjust the balance to any desired individual taste. When the weight is pulled forwardly to the upper end of the bore, the racket becomes relatively head heavy for those who prefer a driving style of game, and when the weight is retracted towards the lower open end of the bore, the racket becomes handle heavy for those who desire an easily movable racket, adapted for example to net play. This change in balance is accomplished without changing the gross weight of the racket.

In the variational form of balance adjusting means shown in Figs. 3 and 6, there is inserted within bore 51 a shaft 56 of polygonal cross section. The inner end of the shaft is rounded at 57 and has a rotating bearing in block 30, while the outer or lower end of the shaft has a bearing in split plate 59 so that the slotted screw head 60 of the shaft projects exteriorly of plate 59 and lies within opening 50 in cap 49. Weight 53 is provided with a longitudinally extending opening of the same shape as shaft 56 but slightly larger so as to freely slide along the shaft. By turning shaft 56, weight 53 may be adjusted longitudinally within the handle to regulate the balance of the racket as described. While I have here shown the weight to be threaded into bore 51 and to have sliding engagement with the shaft, it is to be understood that the invention broadly contemplates the provision of any suitable mechanism for propelling the screw within the handle.

A variational form of frame construction is shown in Fig. 2, wherein I illustrate an open throat construction. The frame is the same as described before except that the bridge across the upper end of the throat 14 is omitted and the triangular throat block has been changed into a small wedge shaped block 61 fitting down into the base of the throat. The veneer covering 62 is formed as before of two layers, but is now changed in shape to follow the contour of the frame. The omission of the bridge and the almost entire elimination of the throat block results in a much lighter racket.

Fig. 7 shows a diagonal arrangement of strings 65. The head is held in a ring instead of in the conventional clamp so that the entire periphery of the head is exposed. The first strings placed are central diagonal ones, as 65a and 65b. These strings are tightened, and then the other strings are added and tightened, one at a time, symmetrically and alternately about the two initial strings, so that at no time is the racket under a large unbalanced force tending to distort it.

The stress on the frame caused by the conventional stringing (Fig. 1) tends to pull the frame into a rectangle, and thus to buckle outwardly the upper corners of the frame. To resist this tendency, the upper horizontal strings are under a greater tension than the other strings. By using the diagonal stringing this tendency is eliminated and all strings are under an even tension. The strings are preferably parallel to the diagonals of the rectangle formed by the horizontal and vertical tangents (i. e.

tangents parallel to the longitudinal and transverse axes of the frame) to the head, so that there is no tendency to distort the frame.

A racket having this string arrangement can be strung more easily and quickly than with the conventional stringing, and also requires a lesser length of string.

While I have shown and described a particular form of my invention, it is to be understood that I am not to be limited thereto, for various changes in structure and arrangement may be made without departing from the spirit and scope of the appended claims.

I claim:

1. In a tennis racket having an oval head and a handle, a frame comprising a plurality of relatively thick plies of wood extending in oval formation to form the head and converging toward a throat and thence extending beyond the throat to form the handle, said plies lying in planes normal to the plane of the head and the grain of said plies running longitudinally of the plies, and a relatively thin ply of wood lying between two adjacent thick plies, extending around the head, lying likewise in a plane normal to the plane of the head, intimately adhered to both the immediately adjacent thick plies, and having its grain running across its width and substantially at right angles to its length, so that the cross grain of the relatively thin ply ties the longitudinal grain of the thicker plies together in a directly transverse direction to prevent splitting of the longitudinal grain.

2. In a tennis racket having an oval head and a handle, a frame comprising two pairs of relatively thick plies of wood extending in oval formation to form the head and converging toward a throat and thence extending beyond the throat to form the handle, said plies lying in planes normal to the plane of the head and the grain of said plies running longitudinally of the plies, the pairs of plies being intimately adhered together, and a relatively thin ply of wood lying between the two adjacent thick plies of each pair, extending around the head, lying likewise in a plane normal to the plane of the head, intimately adhered to both the immediately adjacent thick plies of the pair, and having its grain running across its width and substantially at right angles to its length, so that the cross grain of the relatively thin plies ties the longitudinal grain of the thicker plies of each pair together in a directly transverse direction to prevent splitting of the longitudinal grain.

THEOPHILUS A. DAVIS.